United States Patent
Sabharwal et al.

(10) Patent No.: US 10,268,490 B2
(45) Date of Patent: Apr. 23, 2019

(54) EMBEDDING USER INTERFACE SNIPPETS FROM A PRODUCING APPLICATION INTO A CONSUMING APPLICATION

(71) Applicant: Oracle International Corporation, Redwood Shores, CA (US)

(72) Inventors: Nikhil Sabharwal, Foster City, CA (US); Suman Ganta, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 15/482,356

(22) Filed: Apr. 7, 2017

(65) Prior Publication Data

US 2018/0074800 A1 Mar. 15, 2018

Related U.S. Application Data

(60) Provisional application No. 62/395,286, filed on Sep. 15, 2016.

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/451* | (2018.01) |
| *G06F 9/54* | (2006.01) |
| *G06F 9/455* | (2018.01) |

(52) U.S. Cl.
CPC .............. *G06F 9/451* (2018.02); *G06F 9/54* (2013.01); *G06F 9/45529* (2013.01)

(58) Field of Classification Search
CPC ........................................................ G06F 9/541
USPC ............................................................ 719/320
See application file for complete search history.

(56) References Cited

U.S. PATENT DOCUMENTS

| | | | |
|---|---|---|---|
| 6,643,690 B2* | 11/2003 | Duursma .................. | G06F 9/54 709/203 |
| 2008/0005751 A1* | 1/2008 | Chandra ........... | G06F 17/30896 719/328 |
| 2012/0210011 A1* | 8/2012 | Liu ........................ | H04L 63/10 709/229 |

* cited by examiner

*Primary Examiner* — Timothy A Mudrick
(74) *Attorney, Agent, or Firm* — Trellis IP Law Group, PC (57) ABSTRACT

A user interface of a producing application is accessed. The producing application includes embeddable snippets that each include encapsulated code that provides the functionality of one or more user interface component. Each of the components is for displaying at least a portion of the user interface with user data of the producing application obtained from a server computer and wherein the snippets communicate with Representational State Transfer (REST) application programming interfaces (APIs) of the producing application. At least a portion of a javascript library that includes the embeddable snippet is received. An embedded snippet is created in a user interface of a consuming application by embedding a particular snippet selected from the embeddable snippets into the user interface of the consuming application. The embedded snippet provides a user with the same appearance and interactions as the embeddable snippet without the user logging into the producing application.

20 Claims, 7 Drawing Sheets

EMBEDDING USER INTERFACE SNIPPETS FROM A PRODUCING APPLICATION INTO A CONSUMING APPLICATION

CROSS REFERENCES TO RELATED APPLICATIONS

This application claims priority from U.S. Provisional Patent Application Ser. No. 62/395,286, entitled. UI SNIPPETS AND COMPONENTS—EMBEDDABLE SCRIPTS, filed on Sep. 15, 2016 which is hereby incorporated by reference as if set forth in full in this application for all purposes This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

Conventionally, two approaches have become popular for building user interfaces. One approach involves developing user interfaces using individual Representational State Transfer (REST) application programming interfaces (APIs). Another approach involves embedding an entire application into another application using iFrame. There is a need for an improved approach to user interface development.

SUMMARY

In one embodiment, a user interface of a producing application is accessed. The producing application includes embeddable snippets that each include encapsulated code that provides the functionality of one or more user interface component. Each of the components is for displaying at least a portion of the user interface with user data of the producing application obtained from a server computer and wherein the snippets communicate with Representational State Transfer (REST) application programming interfaces (APIs) of the producing application. At least a portion of a javascript library that includes the embeddable snippet is received. An embedded snippet is created in a user interface of a consuming application by embedding a particular snippet selected from the embeddable snippets into the user interface of the consuming application. The embedded snippet provides a user with the same appearance and interactions as the embeddable snippet without the user logging into the producing application.

An embodiment provides a method of providing components in a user interface, the method comprising: accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application; receiving at least a portion of a javascript library that includes the embeddable snippet; and creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

A further understanding of the nature and the advantages of particular embodiments disclosed herein may be realized by reference of the remaining portions of the specification and the attached drawings.

DETAILED DESCRIPTION OF EMBODIMENTS

Although various embodiments are described in the context of business applications, other embodiments can be adapted for non-business applications. In general, any suitable type of user interface may be built with the features described herein.

A snippet, according to one embodiment, encapsulates user interface functionality that could require significant work for a developer to implement using individual REST APIs. Each snippet provides the functionality of one or more UI components. Snippets can provide complex components that include a plurality of components. For example, a snippet may be used to implement a human resource page for hiring new employees. Each component in the page can provide at least one user interface control. Examples of components include buttons, drop down menus, menu buttons, radio buttons, check boxes, data entry fields, etc.

A first application provides one or more snippets to a second application and the second application embeds the one or more snippets in its user interface. The first application is also referred to as a "parent application" or a "producing application" since it provides the snippets that are used in building the second application.

Figure 1:
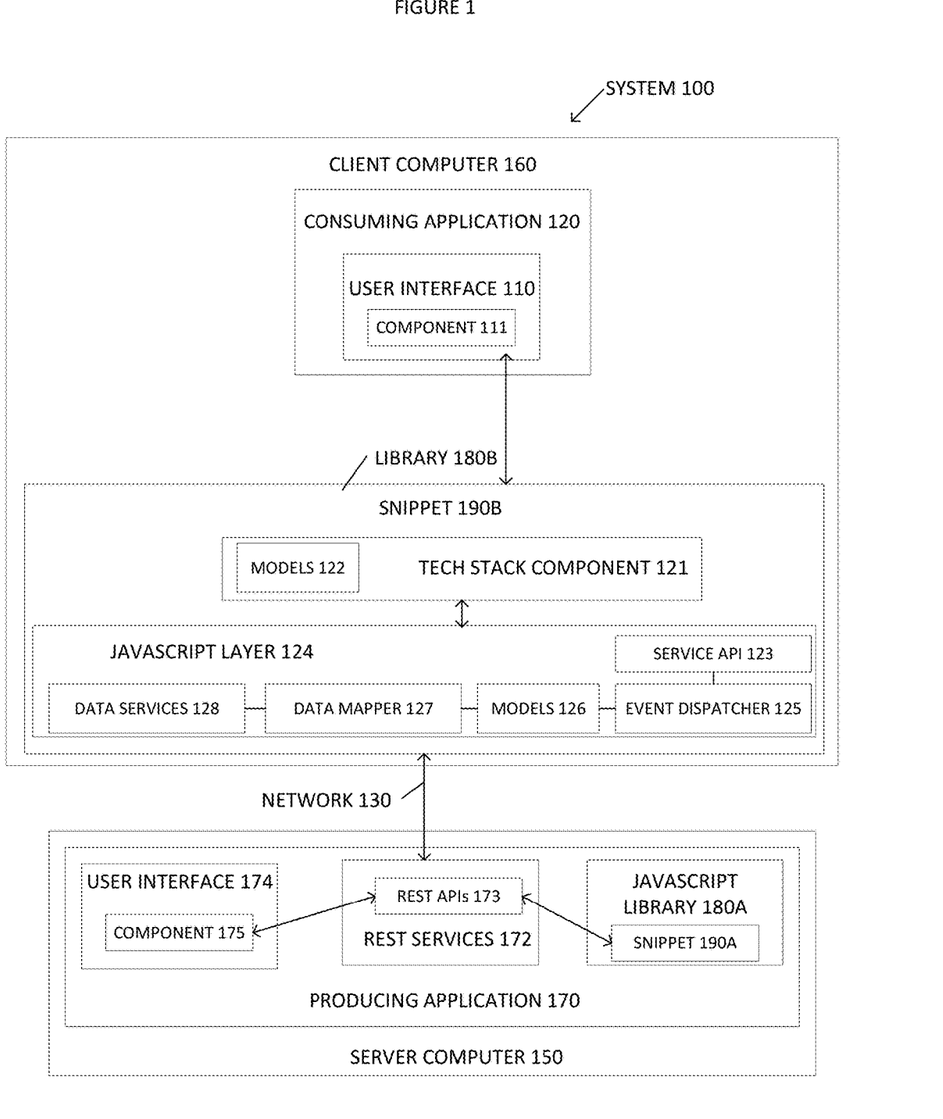
FIG. 1 depicts a system, according to one embodiment.

FIG. 1 depicts a system 100, according to one embodiment.

The system 100 depicts a consuming application 120 with an external application user interface 110 (also referred to herein as a consuming or consumer application user interface), user interface snippets 190A, 190B, a network 130 and server 150. The snippets 190B includes code 121-128. According to one embodiment, the JavaScript layer 124 is implemented entirely in JavaScript. The tech stack component 121 includes ViewModel 122. The JavaScript layer 124 includes a service API 123, an event dispatcher 125, models 126, data mapper 127, and data services 128. The ViewModel 122 is a Javascript file that holds current state of data that the client sees, according to one embodiment. A web browser can have its own ViewModel, a mobile device can have its own ViewModel, and a tablet can have its own ViewModel.

According to one embodiment, the server 150 is a PCS server. The server 150 includes a producing application 170. The producing application 170 includes REST APIs 173, REST services 172, a javascript library 180A that includes a snippet 190A, a user interface 174 that provides a component 175. The snippet 190A also includes the code 121-128.

The producing application 170 is implemented with REST APIs that provide rest services 172. The component 175 is implemented with the REST APIs 173 giving the component 175 its appearance and functionality. Library 180B on the client computer 160 is a copy of at least a portion of the javascript library 180A. The library 180B is a UI component javascript library.

The external application user interface 110 communicates with the tech stack component 121 and consumes the snippet 190B. The tech stack component 121 has two way communication with the JavaScript layer 124, for example, through the service API 123. The service API 123 has two way communication with the event dispatcher 125. The event dispatcher 125 has two way communication with the models 126. The models 126 have two way communication with the data mapper 127. The data mapper 127 has two way communication with the data services 128. The JavaScript Layer 124 has two way communication with the REST services 172 over the network 130.

According to one embodiment, the external application user interface 110 is part of a consuming application 120 (also referred to as a "consumer" or a "consumer application"), as discussed herein. The REST services 172 are part of a producing application 170 (also referred to as a "producer" or a "producer application"). The system 100 include a library 180B of snippets that a plurality of consuming applications can access simultaneously to embed selected embeddable snippets into their respective user interfaces. For the sake of simplicity, FIG. 1 depicts one consuming application 120 and the respective libraries 180A, 180B each include one snippet 190A, 190B. However, embodiments are well suited to multiple consuming applications and the libraries including multiple snippets. According to one embodiment, the external application user interface 110 and the library 180B that includes snippets 190B resides on a client computer 160.

Tech Stack Component 121 can be any client side UI library. According to one embodiment, the tech stack component 121 uses Oracle JET™ for creating the UI's. However, other tools for creating a UI can be employed. The tech stack component 121 can be used to provide the view layer of the architecture.

Service API 123, according to one embodiment, encapsulates the logic that occurs in the models 126, data mapper 127 and data services 128. The service API 123 provides a bridge to connect the view with ViewModels 122. According to one embodiment, the tech stack component 121 is the view that a bridge connects with the ViewModels 122.

The JavaScript Layer 124 includes the service API 123, the event Dispatcher 125, Models 126, Data Mapper 127, and Data Services 128. The JavaScript Layer 124 has two way communication with the REST services 172 over the network 130.

Event dispatcher 125 publishes custom events that occur in the ViewModel 122 so that the consuming application 120 can use those events to get a context of the system 100 and make informed decisions.

Models 126 provides a layer that holds the data that the client computer 160 displays to the user.

Data Mapper 127 converts the data received by the data service layer 127 into a format which can be stored in models 126.

Data services 128 communicate with the rest services 172, which are also referred to herein as "producer," to obtain the required data from the server 150.

Each of the snippets 190A, 190B in the libraries 180A, 180B can be used to implement different types of components. For example, one snippet can be used for a Process Initiation. Another snippet could be used for Pending Tasks of a user. Yet another snippet could be used for attaching files to a task. The snippets can represent complex components that themselves include a plurality of components. For example, the snippet may be used to implement a human resource page for hiring a new employee.

The user of the external application user interface 110 is unaware that the embedded snippet 190B was obtained from a producing application 170 and unaware that the embedded snippet 190B is operating on the client computer 160.

Examples of a consuming application user interface 110 are the user interfaces for products such as business intelligence cloud service (BICS), Side Cloud Services (Sites), Application Builder Cloud Services (ABCS), Document Cloud Services (DOCS), among others.

As technology is moving toward a model where multiple applications in the cloud interact with each other in the background, there is a need for quicker and easier ways of integrating a user interface into a customer facing application and integrating the user interface 110 with services, such as REST services 172, it interacts with. Many cloud services such as business intelligence cloud service (BICS), Side Cloud Services (Sites), Application Builder Cloud Services (ABCS), Document Cloud Services (DOCS), etc. are being integrated with PCS for the human workflow capability. Currently a user needs to log into each application (PCS, ABCS, Docs) separately to complete their work. There are requirements to use PCS functionality outside the scope of a predefined PCS Workspace Application. According to one embodiment, the predefined PCS workspace is an out of the box (OOTB) PCS Workspace Application. A consuming application 120 is provided with parts of a producing application 170 in the form of snippets 190B so that a user can continue working on the client computer 160 with functionality of the producing application 170 without logging into a PCS Workspace.

Various embodiments provide for using Process Cloud Services (PCS) on the client computer 160 by providing reusable and configurable UI snippets 190B that encapsulate processes and logic. The PCS user interface (UI) components use client side libraries 180B, such as a JavaScript Extension Toolkit (JET), to provide customizable, responsive and fast UI's, in the form of snippets, with component options, methods and event mechanisms. These UI's can provide PCS functionality to the consuming application 120. In one embodiment, when the integration is in place the code 121-128 can run on the client side 160. A PCS Rest API 173 is used to interact with the PCS servers 150. The consuming applications 120 do not have to use iframes to load content, such as an entire application or a snippet. The UI 110 functions on different form factors such as mobile, tablet, browser, etc. Thus, various conventional problems associated with consuming an entire application by another application are avoided.

Various embodiments also enable a consuming application 120 to have full control of the PCS lifecycle so that it can extend or modify the lifecycle. For example, various embodiments provide for creating multiple reusable snippets which the consuming application 120 can drop into their UI 110. This provides an integration where instead of using traditional iframe approach to linking two applications, various embodiments provide a client side UI 110 which is based on javascript.

Figure 2:
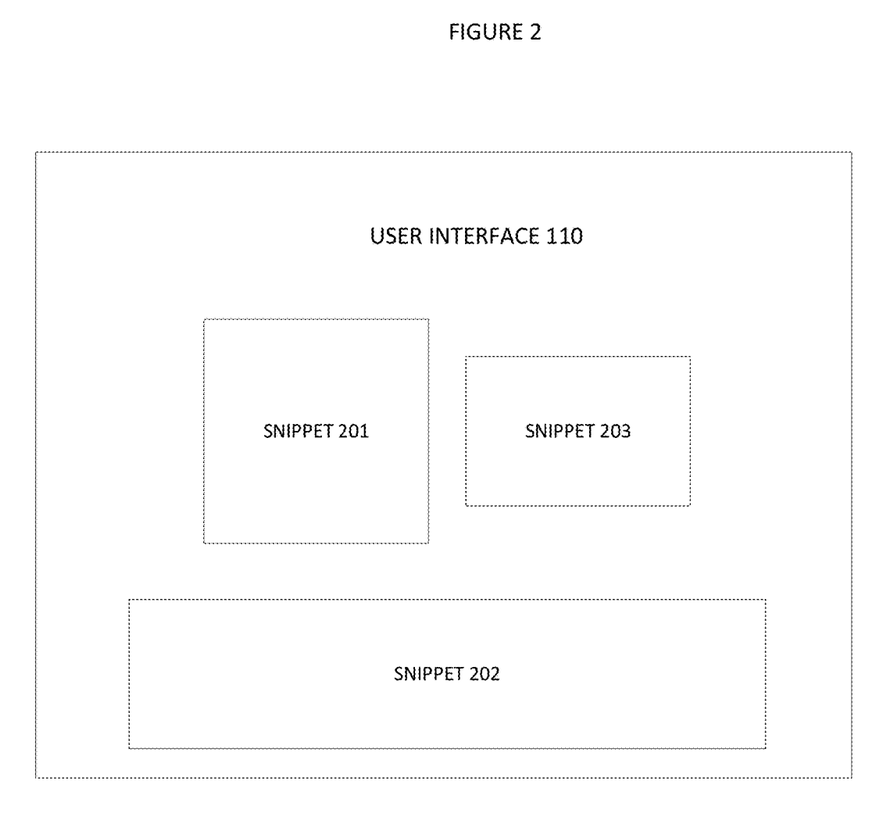
FIG. 2 depicts a block diagram of a consuming application's user interface with plugins, according to one embodiment.

FIG. 2 depicts a block diagram of the external application user interface with snippets where the snippets are provided by embedding snippets into the external application user interface.

For example, FIG. 2 depicts the external application user interface 110 (FIG. 1) with snippets 201, 202, 203 where the snippets 201, 202, 203 are provided by embedding snippets into the external application user interface 110. The embedded snippets 201-203 provide an interface that enables the external application user interface 110 (FIG. 1) to interact with the producing application 170 (FIG. 1). Each one of the embedded snippets 201-203 is an example of a snippet 190B.

Figure 3:
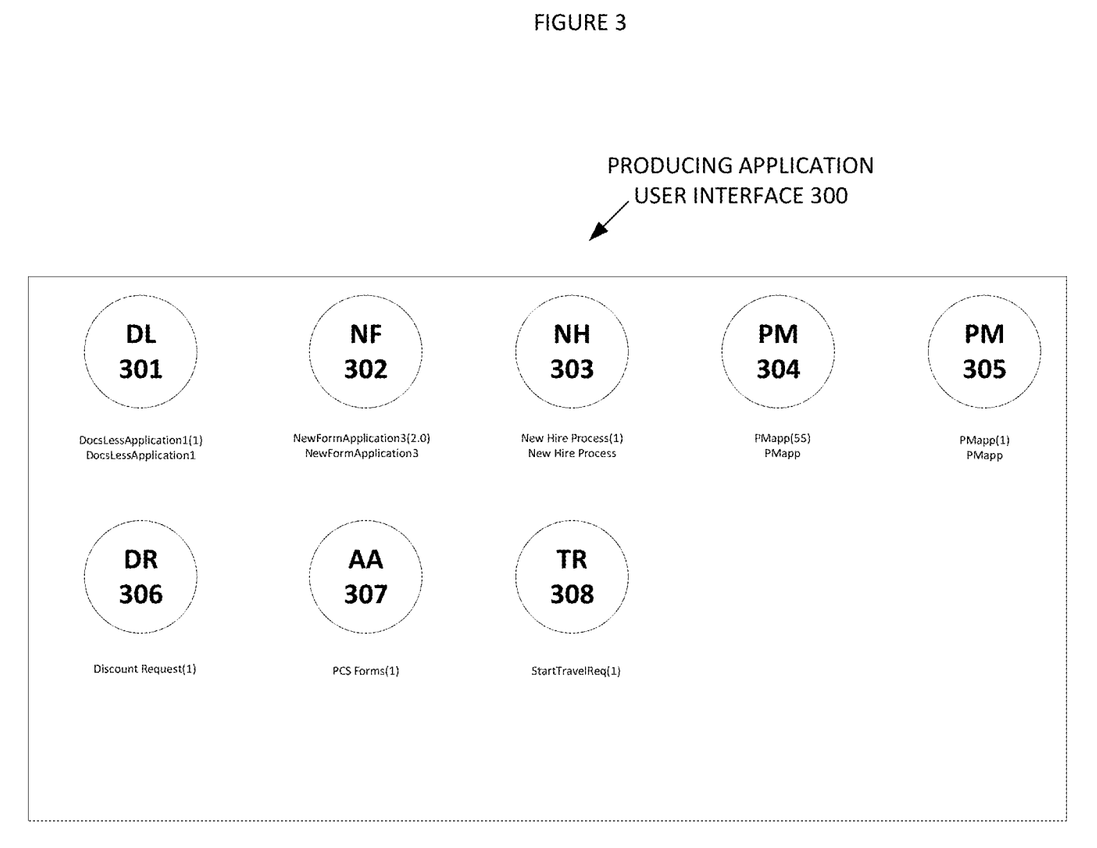
FIG. 3 depicts a user interface of a producing application, according to one embodiment.

FIG. 3 depicts a user interface of a producing application, according to one embodiment.

The user interface 300 of the producing application 170 (FIG. 1) depicts visual representations 301-308 of snippets 190A (FIG. 1) that can be embedded into the user interface 110. The visual representations 301-308 as depicted in FIG. 3 are examples of components 175. As depicted in FIG. 3, the components 175 (FIG. 1) are icons. However, embodiments are well suited for other types of components.

Figure 4:
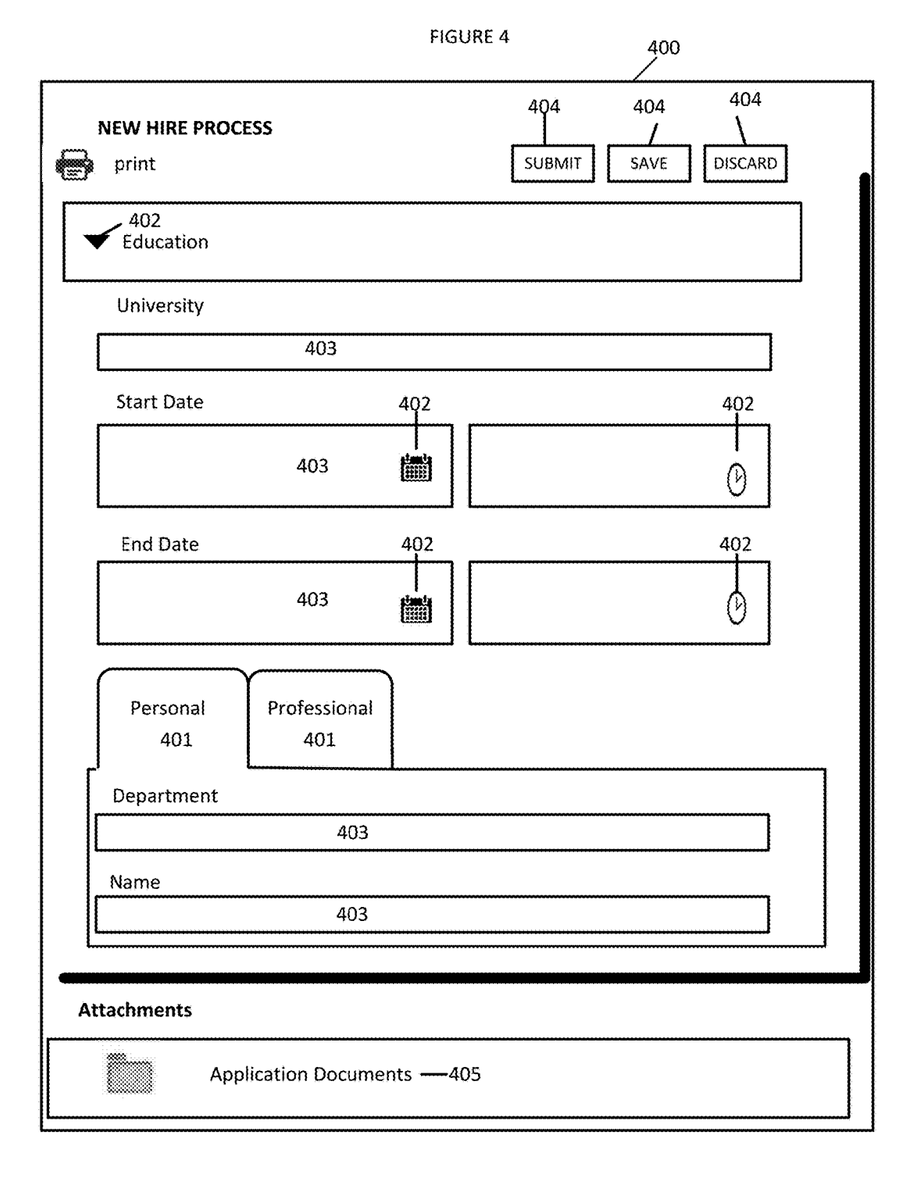
FIG. 4 depicts user interface provided by the snippet, according to one embodiment.

FIG. 4 depicts user interface provided by an embedded snippet, according to one embodiment.

For example, the user interface 400 is a page that is displayed as the result of a user selecting icon 303 depicted in FIG. 3 for a new hire process. User interface 400 is part of the user interfaces 174 and 110. The snippets 190A and 190B in this illustration, is a complex component that includes other components, such as tabs 401 for personal and professional, controls 402, data entry fields 403 for university, start date, end date, department, name, and buttons 404 for submit, save and discard. The user interface 400 also includes an attached document 405. As depicted in user interface 400, the attached document 405 is an employee application. Embodiments are well suited for other types of components as well such as radio buttons, drop down menus, and so on.

User interactions with any one of the embedded components on the client computer 160 results in communications between that embedded component and at least one respective REST service 172 on the server computer 150 via a corresponding REST API 173. Component functionality 121-128 depicted in FIG. 1 provide communications between that embedded component and at least one respective REST service 172 on the server computer 150 via a corresponding REST API 173.

Figure 5:
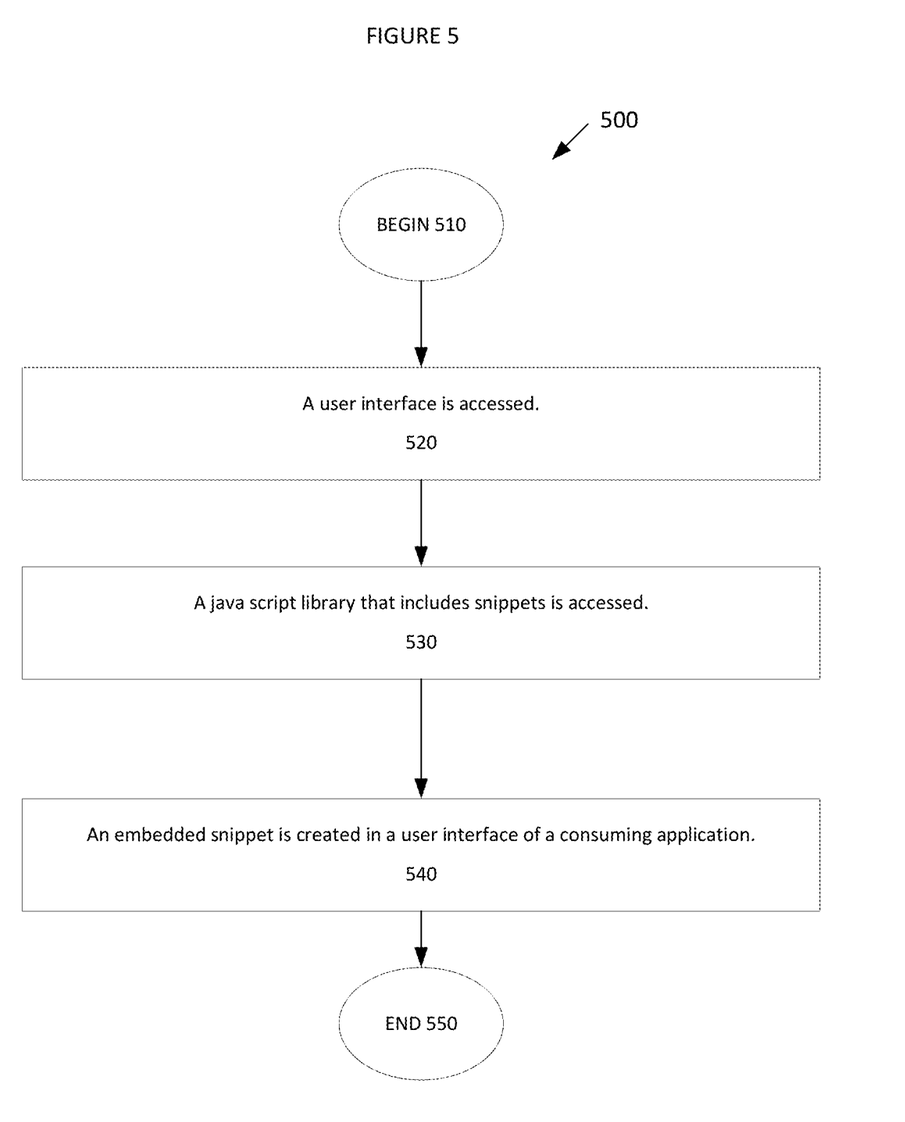
FIG. 5 depicts a flowchart of a method for providing components in a user interface, according to one embodiment.

FIG. 5 depicts a flowchart 500 of a method for providing components in a user interface, according to one embodiment.

At 510, the method begins.

At 520, a user interface is accessed. For example, assume that user interface 300 (FIG. 3) is an example of user interface 174 (FIG. 1). A user interface 174 (FIG. 1), 300 (FIG. 3) of a producing application 170 (FIG. 1) is accessed. The user interface 174, 300 includes embeddable snippets 190A (FIG. 1) that each include encapsulated code 121-128 (FIG. 1) that provides the functionality of one or more user interface components 175 (FIG. 1), 301-308 (FIG. 3). Each of the components is for displaying at least a portion of the user interface 174 (FIG. 1) with user data of the producing application 170 (FIG. 1) obtained from a server computer 150 (FIG. 1). The snippets 190A communicate with Representational State Transfer (REST) application programming interfaces (APIs) 173 (FIG. 1) of the producing application 170 (FIG. 1).

The client computer 160 connects with the server computer 150 and displays the user interface 174, 300. The snippets 190A each represent different types of PCS components. Examples of visual representations of the PCS components 175 are the icons 301-308 of FIG. 3.

At 530, at least a portion of a javascript library that includes the snippets is received. For example, at least a portion of a javascript library 180A (FIG. 1) that includes the embeddable snippets 190A (FIG. 1) is received.

Referring to FIGS. 1 and 3, the portion of the javascript library 180A is provided by the producing application 170, resulting in storing library 180B on the client computer 160 by copying the embeddable snippet 190A into the client computer 160, according to one embodiment. For example, assume in this illustration that the icon 303 (FIG. 3) is an example of a component 175 (FIG. 1) and that the particular snippet is embeddable snippet 190A. The embeddable snippet 190A can be selected because a user selected the icon 303 (FIG. 3) for the new hire process. Information is received indicating that the user performed an action from the user interface 174, 300 of the producing application 170 to the user interface 110 of the consuming application 120. Examples of an action are click or drag and drop. For example, the user can select the icon 303 by clicking on the icon 303 displayed in the user interface 124 or by dragging it from the user interface 174, 300 into the user interface 110.

At 540, an embedded snippet is created in a user interface of a consuming application by embedding a particular snippet selected from the embeddable snippets. For example, an embedded snippet 190B (FIG. 1) is created in a user interface 110 (FIG. 1) of a consuming application 120 (FIG. 1) by embedding a particular snippet 190A (FIG. 1) selected from the embeddable snippets 190A (FIG. 1) into the user interface 110 (FIG. 1) of the consuming application 120 (FIG. 1). The embedded snippet 190B (FIG. 1) provides a user with the same appearance and interactions as the embeddable snippet 190A (FIG. 1) without the user logging into the producing application 170 (FIG. 1).

A particular snippet 190A of the snippets is embedded into the user interface 110 of a consuming application 120, for example, as a part of selecting the embeddable snippet 190A (FIG. 1). Examples of selecting the embeddable snippet 190A (FIG. 1) include clicking on the component 175 or dragging and dropping the component 175 from the user interface 174 to the user interface 110, as discussed herein. The embedded snippet 190B can provide communications between at least a subset of the REST APIs 173 that provide the REST services 172 and the user interface 110 of the consuming application 120. For example, the code 121-128 of the embedded snippet 190B and the REST APIs 173 provides communication between the consuming application 120's user interface 110 and the REST services 172.

In this illustration, the new hire process snippet associated with icon 303 (FIG. 3) can be embedded into the user interface 110 (FIG. 1) of a consuming application 120 (FIG. 1) by consuming at least a part of the UI component javascript library 180A (FIG. 1) provided by the producing application 170 (FIG. 1) to the user interface 110 (FIG. 1) of the consuming application 120 (FIG. 1). As a result of being consumed, a copy of the embeddable snippet 190A (FIG. 1) from the producing application 170 (FIG. 1) is stored as an embedded snippet 190B (FIG. 1) in library 180B (FIG. 1). The functionality of the snippet 190B (FIG. 1) in javascript library 180A (FIG. 1) is copied and embedded into the consuming user interface 110 (FIG. 1). Examples of the functionality that is embedded into the consuming user interface 110 (FIG. 1) include functionality 121-128 (FIG. 1).

Referring to FIG. 1, the server computer 150 is remote with respect to the client computer 160. For example, the client computer 160 and the server computer 150 communicate over a network 130.

At 550, the method ends.

Referring to FIG. 1, after the embedding, the components 111 on the consuming application's user interface 110 that have the same appearance and behavior as the components 175 of the producing application's user interface 174. After the embedding, the client computer 160 can communicate with the REST services 172 via the embedded snippet 190B. Before the embedding, the user had to log into the producing application 170 in order to communicate with the REST services 172.

Referring to FIGS. 1 and 3, the path of execution, before embedding a snippet 190B into the consuming application's user interface 110, involves the user logging into the producing application 170, interacting with the producing application's user interface 174. In this illustration, assume that user interface 300 is an example of the producing application's user interface 174. Each of the icons 301-308 in the producing application's user interface 300 communicated with the REST APIs 173 on the producing application 170. The REST APIs 173 in the producing application 170 communicated with REST services 172 located on the producing application 170. The icons 301-308 are each examples of a component 175 of the producing application 170. The REST APIs 173 give the component 175 in the producing application 170's user interface 174 its appearance and behavior with respect to a user.

Referring to FIG. 1, the path of execution after embedding a snippet 190B into the consuming application's user interface 110, involves the user logging into the consuming application 120, interacting with a component 111 of the user interface 110. The snippet 190B provides communication between the consuming application 120 and the producing application 170. For example, the component 111 communicates with the REST services 172 in the producing application 170 via the embedded snippet 190B and in turn the REST APIs 173.

Initially upon embedding, a user will experience the same appearance and user interactions when interacting with the consuming application's components 111 (FIG. 1) as with the producing application's component 175 (FIG. 1). For example, continuing the illustration, assuming that both of the components 111 and 175 (FIG. 1) are examples of icon 302 (FIG. 3), when a user clicks on either of the components 111 or 175, they will see a new hire process page 400 (FIG. 4). After initial embedding, the appearance and user interaction with a consuming application 120's component 111 can be modified, as discussed herein.

An embodiments provides for creating a connection object at the embedded snippet; and connecting the embedded snippet with a Process Cloud Services (PCS) server based on the connection object, as discussed herein. For example, each of the snippets create a pcsConnection object, which are used internally to obtain connection info for connecting the embedded snippet of the user interface of the consuming application with a Process Cloud Services (PCS) server. The pcsConnection object can be used to request connect with the PCS server resulting in a message with an authorization request header being sent to the consumer application 120. The authorization request header includes a parameter. The parameter includes a valid token. The valid token can be used for connecting the embedded snippet with the PCS server in an authorized manner. The valid token may be a basic authority token, JSON Web Token (JWT) bearer token or OAuth access token. The app main.jss file of the consumer application 120 maintains the valid token.

The basic authorization token can be provided using the following in an embedded snippet to create the connection object:

var tok=username+':'+password;

$.pcsConnection.authInfo='Basic'+btoa(tok);

Other token types, such as a JWT bearer token or an OAuth access token can be provided using the following in an embedded snippet to create the connection object:

$.pcsConnection.authINfo='Bearer'+(token string)

Various embodiments provide for creating user interfaces that work well and are visually appealing on different types of form factors, such as mobile devices, tablets, personal device assistants and various types of browsers. For example, developing user interfaces by embedding snippets provides flexibility in designing the appearance of the user interface to suit a wide variety of form factors without the disadvantages of using individual rest APIs to develop the user interface.

Various embodiments enable a consuming application to have full control of the PCS lifecycle of a producing application so that it can be extended and modified. For example, a producing application may have a life cycle that includes sending a new hire application form. Conventionally, a consuming application could access the producing applications life cycle but could not customize it for the consuming application's purposes. Various embodiments provide for customizing the producing application's life cycle. Continuing the example, the consuming application could customize the life cycle so that after an email is sent, the life cycle also provides for creating a calendar event. Customizing lifecycles is provided with various interfaces and controls for modifying the context of various components. Thus, data describing a life cycle can be obtained from a providing application and it can be customized.

An embodiment provides for customizing the embedded snippet with parameters that are passed to the embedded snippet. For example, referring to FIG. 1, the snippets 190A, 190B are fully configurable. The snippet will fire events according to how it is configured. The types of parameters and associated events are well known in the art. The events and methods of the consuming application 120 can listen for the events or call methods so the consuming application 120 does not directly communicate with the REST services 172 or the rest APIs. Instead, the consuming application 120 communicates with the REST services 172 through the interface provided by the snippet, as discussed herein. Therefore, the consuming application 120 does not need to directly understand the REST services 172. By embedding snippets into a consuming application 120 where the embedded snippets 190B provide the interface to the REST service 172, as discussed herein, the user can obtain the functionality of the component without logging into the producing application 170.

An embodiments provides for providing an intermediate level of abstraction with the embeddable snippets. For example, embeddable snippets 190A provide an intermediate level of abstraction between implementing components entirely with REST APIs and consuming an entire application.

An embodiment provides for receiving information indicating that a user performed an action from the user interface of the producing application to the user interface of the consuming application; and selecting the particular snippet based on the action. For example, referring to FIGS. 1 and 3, information is received indicating that a user performed an action, such as clicking on a component 175, 303 of the user interface 174 of a producing application 170 to a user interface 110 of the consuming application 120 and the particular snippet 190A associated with that component 175 is selected based on the action.

An embodiment provides for wherein the receiving of the information indicating that the user performed the action from the user interface of the producing application further comprises: receiving the information indicating that the user selected a component depicted in the user interface of the producing application, wherein the component represents the particular snippet. For example, referring to FIG. 1, the component 175 represents the snippet 190A.

An embodiments provides for making a copy of the particular snippet and embedding the copy of the particular snippet in the user interface of the consuming application. For example, referring to FIG. 1, a copy 190B of the snippet 190A is made and the copy 190B is embedded in the user interface 110 of the consuming application 120.

An embodiment provides for providing communications between the embedded snippet and a subset of the REST APIs that implement a component in the user interface of the producing application, wherein the component is associated with the particular snippet. For example, referring to FIG. 1, communications are provided between the embedded snippet 190B and a subset of the REST APIs 173. The code 121-128, according to one embodiment, provides communications between the embedded snippet 190B and the REST APIs 173. The REST APIs implement the component 175 in the user interface 174 of the producing application 170.

An embodiment provides for embedding the particular snippet into the user interface without iFraming the producing application into the consuming application. For example, referring to FIG. 1, the particular snippet 190A is embedded into the user interface 110 without iFraming. More specifically, the particular snippet 190A is embedded, for example, based on a user action, such as clicking on the component 175 associated with the particular snippet 190A or by dragging and dropping the component 175 from the user interface 174 into the user interface 110.

An embodiment provides for wherein the user interface of the consuming application is based on Javascript. For example, referring to FIG. 1, the user interface 110 of the consuming application 120 is based on Javascript.

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor, such as a central processing unit, associated with the computer system. The tangible processor-readable storage device is hardware memory and the one or more processors are hardware processors.

An embodiment provides for a tangible processor-readable storage device including instructions executable by a digital processor for providing components in a user interface wherein the tangible processor-readable storage device includes instructions executable by one or more processors for: accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application; receiving at least a portion of a javascript library that includes the embeddable snippet; and creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

An embodiment provides for an apparatus comprising: one or more processors; and a tangible processor-readable storage device including instructions for: accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application; receiving at least a portion of a javascript library that includes the embeddable snippet; and creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

Figure 6:
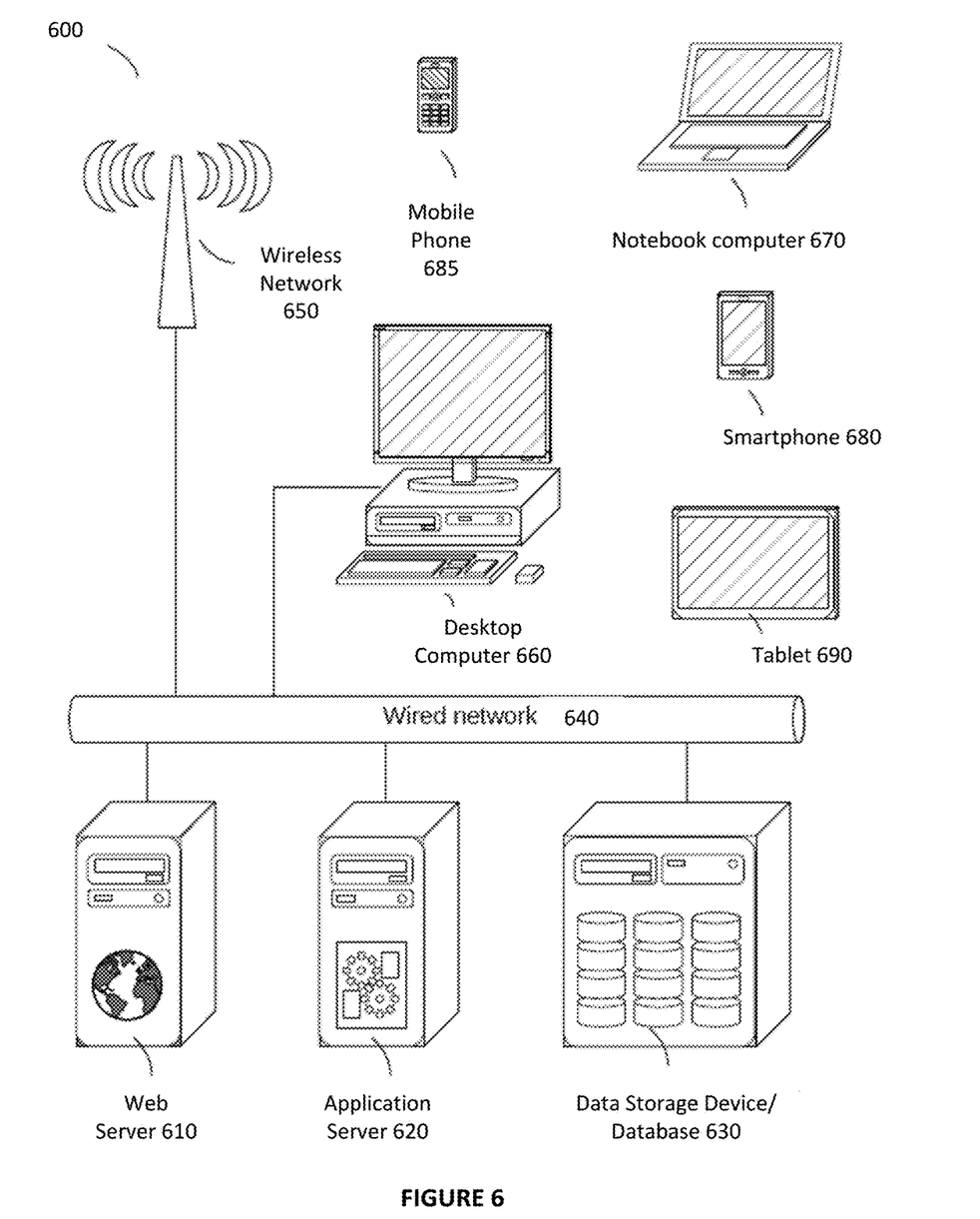
FIG. 6 is a general block diagram of a system and accompanying computing environment usable to implement the embodiments of FIGS. 1-5.

FIG. 6 is a general block diagram of a system 600 and accompanying computing environment usable to implement the embodiments of FIGS. 1-5. The example system 600 is capable of supporting or running various hardware and/or software modules and associated methods discussed with reference to FIGS. 1-5. Note that certain embodiments may be implemented using one or more standalone applications (for example, residing in a user device) and/or one or more web-based applications implemented using a combination of client-side and server-side code.

The general system 600 includes user devices 660-690, including desktop computers 660, notebook computers 670, smartphones 680, mobile phones 685, and tablets 690. The general system 600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 600 is shown with five user devices, any number of user devices can be supported.

A web server 610 is used to process requests from web browsers and standalone applications for web pages, electronic documents, enterprise data or other content, and other data from the user computers. The web server 610 may also provide push data or syndicated content, such as RSS feeds, of data related to enterprise operations.

An application server 620 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 620 are adapted to process input data and user computer requests and can store or retrieve data from data storage device or database 630. Database 630 stores data created and used by the data applications. In an embodiment, the database 630 includes a relational database that is adapted to store, update, and retrieve data in response to SQL format commands or other database query languages. Other embodiments may use unstructured data storage architectures and NoSQL (Not Only SQL) databases.

In an embodiment, the application server 620 includes one or more general-purpose computers capable of executing programs or scripts. In an embodiment, web server 610 is implemented as an application running on the one or more general-purpose computers. The web server 610 and application server 620 may be combined and executed on the same computers.

An electronic communication network 640-650 enables communication between user computers 660-690, web server 610, application server 620, and database 630. In an embodiment, networks 640-650 may further include any form of electrical or optical communication devices, including wired network 640 and wireless network 650. Networks 640-650 may also incorporate one or more local-area networks, such as an Ethernet network, wide-area networks, such as the Internet; cellular carrier data networks; and virtual networks, such as a virtual private network.

The system 600 is one example for executing applications according to an embodiment of the invention. In another embodiment, application server 620, web server 610, and optionally database 630 can be combined into a single server computer application and system. In a further embodiment, virtualization and virtual machine applications may be used to implement one or more of the application server 620, web server 610, and database 630.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 6, the client computer 160 may be implemented in whole or in part via one or more of the desktop computer 660, notebook computer 670, smartphone 680, mobile phone 685, tablet 690, of FIG. 6 and/or other computing devices. In a particular example embodiment, the computing devices 660-690 run browsers, e.g., used to display the user interfaces 110, 174, 300, 400 of FIGS. 1, 3, and 4. The network 130 may be a wired network 640 and/or wireless network 650. The server computer 150 may be implemented in whole or in part via one or more of the web server 610 and/or the application server 620.

In a particular example embodiment, browsers of the client computer 160 of FIG. 1 connect to the Internet, represented by the wired network 640 and/or wireless network 650 as shown in FIG. 6, to access one or more network-coupled servers, databases, and/or associated cloud-based functionality, as represented by the entities 120 and 190B of FIG. 1. Note that one or more of the web server 610, application server 620, and data storage device or database 630 shown in FIG. 6 may be used to host software corresponding to the producing application 170 of FIG. 1, as detailed more fully below.

In general, software developers e.g., users of the client computer 160 and/or the server computer 150 of FIG. 1, may subscribe to certain cloud services. A cloud service that is configured for software application or process flow development is called a Process Cloud Service (PCS) herein. According to one embodiment, server computer 150 is a PCS server.

A process cloud service may employ a networked database, e.g., the data storage device 630 of FIG. 6, to store files and other objects used by a given software program being developed. Server-side development environments may be accessible to developers via browsers. The development environments may be backed by the PCS, such that developed software application files are stored in the PCS database corresponding to the one or more of the data storage devices 630 of FIG. 6.

According to one embodiment, the UI display screens (examples of which are shown in FIGS. 1, 2, 3 and 4) include accompanying UI controls and associated options. Example options include options to icons, buttons, drop down menus, tabs, data entry fields, and so on.

Note that in the particular example embodiment, browsers used by the client computer 160 and the server computer 150 of FIG. 1, interface with web servers 610 shown in FIG. 6 to access websites and accompanying webpage code. The webpage code of the web servers 610 of FIG. 6 use web services, APIs, and/or other interfacing mechanisms to communicate with application software hosted on application servers 620 of FIG. 6 of the cloud, which includes a collection of web servers 610, application servers 620, and data storage devices 630 of FIG. 6.

Figure 7:
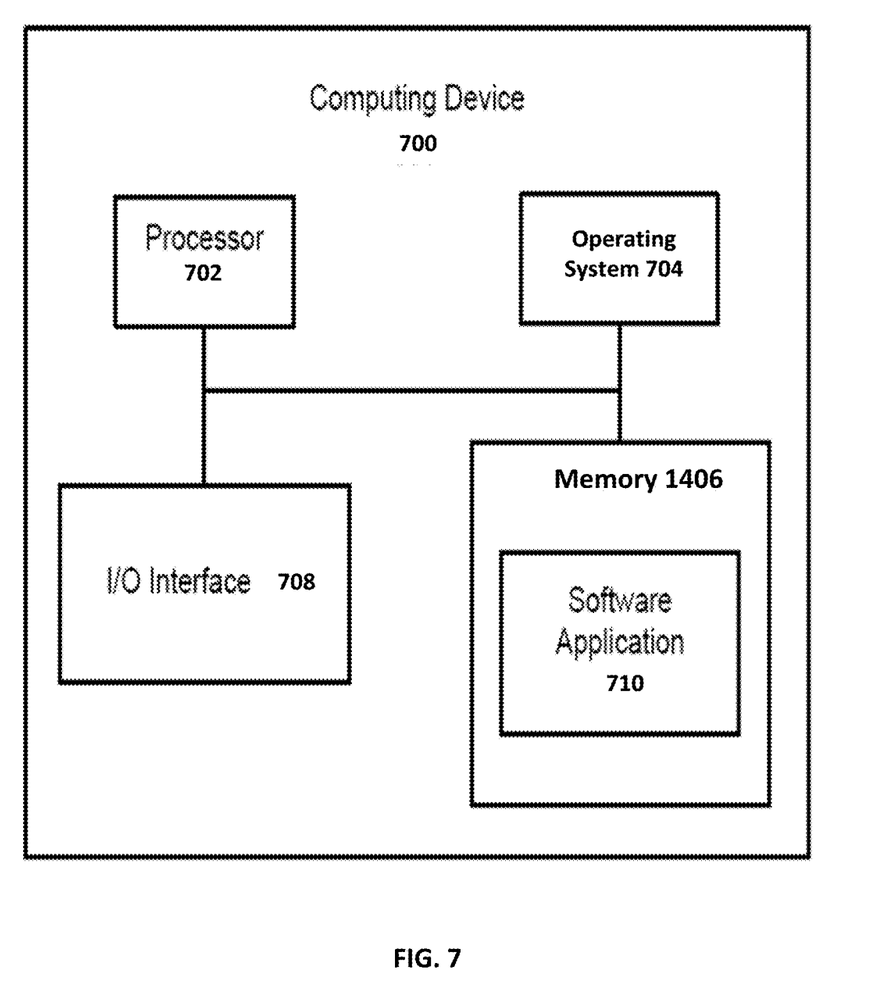
FIG. 7 is a general block diagram of a computing device usable to implement the embodiments of FIGS. 1-5.

FIG. 7 is a general block diagram of a computing device 700 usable to implement the embodiments described herein. While the computing device 700 of FIG. 7 may be described as performing one or more of the steps in the embodiments herein, in other embodiments any suitable component or combination of components of the computing device 700 or any suitable processor or processors associated with system 700 may facilitate performing the steps.

FIG. 7 illustrates a block diagram of an example computing system 700, which may be used for implementations described herein. For example, computing system 700 may be used to implement user computers 660-690 and the server devices 610, 620 of FIG. 6 as well as to perform the method implementations described herein. In some implementations, computing system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of system 700 or any suitable processor or processors associated with system 700 or any suitable system may perform the steps described. Implementations described herein may be carried out on a user device, on a server, or a combination of both.

Computing device 700 also includes a software application 710, which may be stored on memory 706 or on any other suitable storage location or computer-readable medium. Software application 710 provides instructions that enable processor 702 to perform the functions described herein and other functions. The components of computing system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computing system 700 may not have all of the components shown and/or may have other elements including other types of components instead of, or in addition to, those shown herein.

Although the description has been described with respect to particular embodiments thereof, these particular embodiments are merely illustrative, and not restrictive. Various embodiments are well suited for many different types of components, as discussed herein. Various embodiments are well suited for using other types of programming languages. Various features may be arranged differently than they are described herein. Various embodiments are well suited for other types of cloud services besides PCS, such as at least Service Now or Sales Force.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Various embodiments can be provided with logic encoded in one or more tangible media for execution by one or more hardware processors operable to perform the various embodiments described herein.

We claim:

1. A tangible processor-readable storage device including instructions executable by a digital processor for providing components in a user interface wherein the tangible processor-readable storage device includes instructions executable by one or more processors for:
  accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application;
  receiving at least a portion of a javascript library that includes the embeddable snippet; and
  creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

2. The tangible processor-readable storage device as recited by claim 1, wherein the instructions are further for:
  customizing the embedded snippet with parameters that are passed to the embedded snippet.

3. The tangible processor-readable storage device as recited by claim 1, wherein the instructions are further for:
  providing an intermediate level of abstraction with the embeddable snippets.

4. The tangible processor-readable storage device as recited by claim 1, wherein the instructions are further for:

receiving information indicating that a user performed an action from the user interface of the producing application to the user interface of the consuming application; and selecting the particular snippet based on the action.

5. The tangible processor-readable storage device as recited by claim 4, wherein the receiving of the information indicating that the user performed the action from the user interface of the producing application further comprises:

receiving the information indicating that the user selected a component depicted in the user interface of the producing application, wherein the component represents the particular snippet.

6. The tangible processor-readable storage device as recited by claim 1, wherein the embedding of the particular snippet into the user interface of the consuming application further comprises:

making a copy of the particular snippet and embedding the copy of the particular snippet in the user interface of the consuming application.

7. The tangible processor-readable storage device as recited by claim 6, wherein the instructions are further for:

providing communications between the embedded snippet and a subset of the REST APIs that implement a component in the user interface of the producing application, wherein the component is associated with the particular snippet.

8. The tangible processor-readable storage device as recited by claim 1, wherein the embedding of the particular snippet into the user interface of the consuming application further comprises:

embedding the particular snippet into the user interface without iFraming the producing application into the consuming application.

9. The tangible processor-readable storage device as recited by claim 1, wherein the user interface of the consuming application is based on Javascript.

10. The tangible processor-readable storage device as recited by claim 1, wherein the instructions are further for:

creating an connection object at the embedded snippet; and connecting the embedded snippet with a Process Cloud Services (PCS) server based on the connection object.

11. A method of providing components in a user interface, the method comprising:

accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application;

receiving at least a portion of a javascript library that includes the embeddable snippet; and creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

12. The method as recited by claim 11, wherein the method further comprises:

customizing the embedded snippet with parameters that are passed to the embedded snippet.

13. The method as recited by claim 11, wherein the method further comprises:

providing an intermediate level of abstraction with the embeddable snippets.

14. The method as recited by claim 11, wherein the method further comprises:

receiving information indicating that a user performed an action from the user interface of the producing application to the user interface of the consuming application; and selecting the particular snippet based on the action.

15. The method as recited by claim 14, wherein the receiving of the information indicating that the user performed the action from the user interface of the producing application further comprises:

receiving the information indicating that the user selected a component depicted in the user interface of the producing application, wherein the component represents the particular snippet.

16. The method as recited by claim 11, wherein the embedding of the particular snippet into the user interface of the consuming application further comprises:

making a copy of the particular snippet and embedding the copy of the particular snippet in the user interface of the consuming application.

17. The method as recited by claim 16, wherein the method further comprises:

providing communications between the embedded snippet and a subset of the REST APIs that implement a component in the user interface of the producing application, wherein the component is associated with the particular snippet.

18. The method as recited by claim 11, wherein the embedding of the particular snippet into the user interface of the consuming application further comprises:

embedding the particular snippet into the user interface without iFraming the producing application into the consuming application.

19. The method as recited by claim 11, wherein the method further comprises:

creating an connection object at the embedded snippet; and connecting the embedded snippet with a Process Cloud Services (PCS) server based on the connection object.

20. An apparatus comprising:

one or more processors; and a tangible processor-readable storage device including instructions for:

accessing a user interface of a producing application that includes embeddable snippets that each include encapsulated code that provides the functionality of one or more user interface component, wherein each of the components is for displaying at least a portion of the user interface with user data of the producing application obtained from a server computer and wherein the snippets communicate with Representational State Transfer (REST) application programming interfaces (APIs) of the producing application;

receiving at least a portion of a javascript library that includes the embeddable snippet; and creating an embedded snippet in a user interface of a consuming application by embedding a particular snippet selected from the embeddable snippets into the user interface of the consuming application, wherein the embedded snippet provides a user with the same appearance and interactions as the embeddable snippet without the user logging into the producing application.

\* \* \* \* \*

UNITED STATES PATENT AND TRADEMARK OFFICE
CERTIFICATE OF CORRECTION

PATENT NO. : 10,268,490 B2
APPLICATION NO. : 15/482356
DATED : April 23, 2019
INVENTOR(S) : Sabharwal et al.

It is certified that error appears in the above-identified patent and that said Letters Patent is hereby corrected as shown below:

In the Specification

In Column 1, Line 13, delete "purposes" and insert -- purposes. --, therefor.

In Column 11, Line 22, delete "can created" and insert -- can be created --, therefor.

Signed and Sealed this
Twenty-first Day of July, 2020

Andrei Iancu
*Director of the United States Patent and Trademark Office*